(12) United States Patent
Hutchinson

(10) Patent No.: US 7,752,308 B2
(45) Date of Patent: *Jul. 6, 2010

(54) SYSTEM FOR MEASURING WEB TRAFFIC

(76) Inventor: Kevin P. Hutchinson, 27 Old Gloucester Street, London (GB) WC1N 3XX ( * ) Notice: Subject to any disclaimer, the term of this patent is extended or adjusted under 35 U.S.C. 154(b) by 256 days.

This patent is subject to a terminal disclaimer.

(21) Appl. No.: 11/978,906

(22) Filed: Oct. 30, 2007

(65) Prior Publication Data

US 2009/0112977 A1    Apr. 30, 2009

(51) Int. Cl.
G06F 15/173 (2006.01)
G06F 15/16 (2006.01)

(52) U.S. Cl. .................. 709/224; 709/206
(58) Field of Classification Search .......... 709/224, 709/206

See application file for complete search history.

(56) References Cited

U.S. PATENT DOCUMENTS

| | | | |
|---|---|---|---|
| 5,787,253 A | 7/1998 | McCreery et al. |
| 6,112,238 A | 8/2000 | Boyd et al. |
| 6,167,441 A | 12/2000 | Himmel |
| 6,317,787 B1 | 11/2001 | Boyd et al. |
| 6,360,261 B1 | 3/2002 | Boyd et al. |
| 6,393,407 B1 | 5/2002 | Middleton, III et al. |
| 6,393,479 B1 | 5/2002 | Glommen et al. |
| 6,434,614 B1 * | 8/2002 | Blumenau ............... 709/224 |
| 6,539,392 B1 | 3/2003 | Rebane |
| 6,662,227 B2 | 12/2003 | Boyd et al. |
| 6,751,654 B2 | 6/2004 | Massarani et al. |
| 6,789,115 B1 | 9/2004 | Singer et al. |
| 6,792,458 B1 | 9/2004 | Muret et al. |
| 6,804,701 B2 | 10/2004 | Muret et al. |
| 6,925,442 B1 | 8/2005 | Shapira et al. |
| 6,944,827 B2 | 9/2005 | Gao et al. |
| 6,971,107 B2 | 11/2005 | Sjostrom et al. |
| 7,031,932 B1 | 4/2006 | Lipsky et al. |
| 7,085,682 B1 | 8/2006 | Heller et al. |
| 7,185,085 B2 | 2/2007 | Bean |
| 7,206,838 B2 | 4/2007 | Boyd et al. |
| 7,216,162 B2 | 5/2007 | Amit et al. |
| 7,222,171 B2 | 5/2007 | Fukumoto et al. |
| 7,225,246 B2 | 5/2007 | Shapira |
| 2002/0087679 A1 | 7/2002 | Pulley et al. |
| 2002/0165954 A1 * | 11/2002 | Eshghi et al. ............... 709/224 |
| 2003/0115586 A1 | 6/2003 | Lejouan et al. |

(Continued)

FOREIGN PATENT DOCUMENTS

EP    2 056 571 A2    5/2009

(Continued)

*Primary Examiner*—Wing F Chan
*Assistant Examiner*—Nam Thai
(74) *Attorney, Agent, or Firm*—Malloy & Malloy, P.A.

(57) ABSTRACT

A system is presented for measuring, analyzing and/or reporting web traffic, predetermined events, and/or user activity on one or more web pages utilizing a landing page having code embedded thereon, wherein the program code is structured to deploy at least one portal element onto the landing page. Further, the portal element is structured to display at least one web page therein, while remaining substantially imperceptible at a client interface. Additionally, the program code is structured to detect a source of the web visit, and other predetermined events, including mouse clicks and other navigation activity.

23 Claims, 12 Drawing Sheets

U.S. PATENT DOCUMENTS

| | | |
|---|---|---|
| 2003/0140103 A1* | 7/2003 | Szeto et al. ............... 709/206 |
| 2003/0163563 A1 | 8/2003 | Bean |
| 2003/0231203 A1 | 12/2003 | Gallella |
| 2004/0015580 A1 | 1/2004 | Lu et al. |
| 2006/0031404 A1 | 2/2006 | Kassab |
| 2006/0117256 A1 | 6/2006 | Miller et al. |
| 2007/0061412 A1 | 3/2007 | Karidi et al. |
| 2007/0143343 A1 | 6/2007 | Iverson |

FOREIGN PATENT DOCUMENTS

| | | |
|---|---|---|
| WO | WO 01/02932 A2 | 1/2001 |

* cited by examiner

```
01 <!DOCTYPE html PUBLIC "-//W3C//DTD HTML 4.01 Transitional//EN"
   "http://www.w3.org/TR/html4/loose.dtd">
02 <!-- Copyright © 2007 Guanoo, Inc. All Rights Reserved <legal@guanoo.com> -->
03 <html lang="en">
04 <head>
05 <title></title>
06 <meta http-equiv="Content-Type" content="text/html; charset=UTF-8">
07 <style type="text/css">
08 html, body, iframe {overflow: auto; margin: 0px; padding: 0px; width: 100%; height: 100%}
09 </style>
10 <script type="text/javascript">
11 var guanoo = {
12     site: 123,
13     name: '',
14     page: new String(window.location),
15
16     loaded: function() {
17         var url;
18         try {
19             url = new String(frames.site.location);
20             if (url.substr(0, 4) != 'http') return;
21         } catch(e) {
22             url = 'unknown';
23         }
24         this.script('ajax.php?site=' + this.site + '&time=' + new Date().getTime() + '&url=' + escape(url) + '&ref=' + escape(document.referrer) + '&name=' + escape(this.name));
25         top.document.title = frames.site.document.title;
26     },
```

(to FIGURE 2B)

FIGURE 2A (from FIGURE 2A)

```
27
28     script: function(request) {
29         var element = document.createElement('SCRIPT');
30         element.src = 'http://www.guanoo.com/'+request;
31         element.type = 'text/javascript';
32         var head = document.getElementsByTagName('HEAD')[0];
33         head.appendChild(element);
34     }
35 };
36 </script>
37 </head>
38 <body>
39 <iframe name="site" src="" onload="guanoo.loaded()" frameborder="0"></iframe>
40 <script type="text/javascript">
41 var q = guanoo.page.indexOf('?');
42 var h = guanoo.page.indexOf('#');
43 frames.site.location = q < 0 ? '/' : guanoo.page.substring(q + 1);
44 guanoo.script('goal.php?site=' + guanoo.site);
45 guanoo.name = h < 0 ? '' : q < 0 ? guanoo.page.substring(h + 1) : guanoo.page.substring(h + 1, q);
46 </script>
47 <noscript><iframe name="site" src="/" frameborder="0"></iframe></noscript>
48 </body>
49 </html>
```

```
01 <!DOCTYPE html PUBLIC "-//W3C//DTD HTML 4.01 Transitional//EN"
"http://www.w3.org/TR/html4/loose.dtd">
02 <html lang="en">
03 <head>
04 <title>Landing page 1</title>
05 <meta http-equiv="Content-Type" content="text/html; charset=UTF-8">
06 <style type="text/css">
07 html, body, iframe {overflow: auto; margin: 0px; padding: 0px; width: 100%; height: 100%}
08 </style>
09 <script type="text/javascript">
10 var guanoo = {
11   site: 123,
12   name: '',
13   page: new String(window.location),
14
15   loaded: function(landing_url) {
16       var url = landing_url;
17       try {
18           if (!url) url = new String(frames.site.location);
19           if (url.substr(0, 4) != 'http') return;
20       } catch(e) {
21           url = 'unknown';
22       }
23       this.script('ajax.php?site=' + this.site + '&time=' + new Date().getTime() + '&url=' +
escape(url) + '&ref=' + escape(document.referrer) + '&name=' + escape(this.name));
24       if (!landing_url) top.document.title = frames.site.document.title;
25   },
26 script: function(request) {
27       var element = document.createElement('SCRIPT');
28       element.src = 'http://www.guanoo.com/'+request;
29       element.type = 'text/javascript';
30       var head = document.getElementsByTagName('HEAD')[0];
31       head.appendChild(element);
32 },
```

(to FIGURE 2D)

FIGURE 2C (from FIGURE 2C)

```
33  display: function() {
34      var iframe = frames.site.document;
35      var content = document.getElementById('content').innerHTML;
36      iframe.body.innerHTML = content;
37      this.loaded(new String(window.location));
38  }
39  };
40  </script>
41  </head>
42  <body onLoad="guanoo.display()">
43  <iframe name="site" src="" onload="guanoo.loaded()" frameborder="0"></iframe>
44
45  <!-- Start of initial iframe content -->
46  <div style="display:none" id="content">
47  <h1>Landing page 1</h1>
48  This landing page is hosted at www.website.com with other web pages.
49  <a href="http://www.website.com/webpage1.html">Link to web page 1</a>
50  <a href="http://www.website.com/webpage2.html">Link to web page 2</a>
51  </div>
52  <!-- End of initial iframe content -->
53
54  <script type="text/javascript">
55  var h = guanoo.page.indexOf('#');
56  guanoo.script('goal.php?site=' + guanoo.site);
57  guanoo.name = h < 0 ? '' : guanoo.page.substring(h + 1);
58  </script>
59  <noscript><iframe name="site" src="/" frameborder="0"></iframe></noscript>
60  </body>
61  </html>
```

FIGURE 2D

SYSTEM FOR MEASURING WEB TRAFFIC

BACKGROUND OF THE INVENTION

1. Field of the Invention

The present specification is generally directed to a system and method of measuring, analyzing and/or reporting web traffic, predetermined events, and/or user activity on one or more web pages on an interactive computer network.

2. Background

As the World Wide Web continues to drive or at least play a significant role in modern day economics, it is particularly important for web site developers, owners, webmasters, etc., especially in the e-commerce business, to tailor their web site(s) and/or marketing and advertising campaigns associated therewith, so as to obtain the maximum financial gain or return on investment. For example, in an e-commerce business, the owner, marketing/advertising director, or other administrative contact may develop or deploy one or more marketing campaigns to direct consumers to one or more corresponding web sites via various advertisements. In particular, the web site(s), or the products/services offered for sale thereon, may be advertised through any one or more of a plurality of mediums, such as, for example, on other web site(s) throughout the Internet, print, television, radio, etc. In any event, the owner desires to maximize the financial gain obtained from the various marketing and/or advertising campaigns directed to the corresponding web site(s).

In order to maximize the gains and/or return-on-investment based upon the various advertising and/or marketing campaigns directed to a particular web site or a set of web sites, in addition to identifying how a user was directed to a particular web site or web page, for example, by the user responding to or reacting to a marketing or advertising campaign, it would be beneficial to measure, monitor, and/or analyze the traffic or navigation between various web pages on the web site. It would also be beneficial to measure, monitor, and/or analyze predetermined events and other user activity such as duration of time spent on the web site, mouse or pointer clicks and/or movement, etc. The study and/or monitoring of such behavior by web site visitors is commonly referred to as web analytics.

In particular, the study or monitoring of web behavior has been typically employed by two approaches, namely, web server log-file analysis and page tagging or web bugs. The first approach, i.e., web server log-file analysis, typically includes the employment of specially designed web log analysis software to analyze one or more log files retained on a web server. It is not uncommon for a web server to contain a log file with recorded transactions or other activity occurring on various web sites contained on the web server. In fact, the vast majority of web servers employ such log files. Recently, however, one or more web pages associated with a single internet domain name have been hosted on a plurality of web servers, with each web server having its own log file. Accordingly, as the number of web servers for a single internet domain increases, the less efficient log file analysis becomes.

Moreover, the most recent log file analyzers are commonly known to employ HTTP cookies in order to track visits or page views by web users. Cookies consist of text and/or other data transmitted to a user's web browser by a web server serving a web domain, and then transmitted back to the web server serving the web domain each time the particular web browser accesses the respective web domain. Cookies have been criticized and are disfavored for a variety of reasons. For example, cookies are a concern relative to Internet privacy, and as such, have been the subject of litigation concerning the same. In addition, cookies are commonly the source of the inaccurate identification of users, and can further be used for various, potentially hazardous, network attacks. Furthermore, cookies are often a disfavored means of obtaining information and/or tracking users in light of the fact that most modern day web browsers are equipped with settings or configurations that allow the user to reject cookies, thereby rendering some websites completely inaccessible or inoperable.

The second commonly utilized tactic to study or monitor web behavior, i.e., page tagging or web bugs, generally consists of one or more objects embedded in a web page that facilitates the ability of a server to track web users. In such a system, each and every web page for which the server is to monitor visits, views, or other activity, must be tagged or must otherwise include at least a portion of specifically designed and tailored program code. Furthermore, page tagging is also commonly implemented in conjunction with the use of cookies which, as noted above, are highly criticized and disfavored for measuring web traffic and other activity.

As such, it would be particularly beneficial to provide a system and method for measuring web traffic which is structured to easily and efficiently identify the source of the traffic, as well as monitor and analyze various predetermined events including but not limited to web page navigation, session duration, pointer clicks, etc. It would also be advantageous to provide a system and method which formulates a plurality of web pages associated with a web site without having to embed objects, program code, or other structures, devices, or elements on each web page in order to monitor traffic or other activity thereon.

SUMMARY

The present specification is directed to a system and method for measuring, analyzing and/or reporting web traffic, predetermined events, and/or user activity on one or more web pages transmitted via an interactive computer network. In particular, at least one embodiment of the system includes a measurement service and at least one web server disposed in a communicative relation via an interactive computer network. The interactive computer network may include, but is not limited to, access to the World Wide Web, such as via the Internet. In addition, in at least one embodiment, the system includes a client interface disposed in a communicative relation with the interactive computer network and structured to submit a request to the web server(s) and initiate at least a first session.

Furthermore, in one embodiment, the system includes a web site having a plurality of web pages, at least one of which includes a landing page having program code embedded thereon. The program code is structured to deploy at least one portal element onto the landing page and display one or more web pages therein. The portal element is further structured to remain substantially imperceptible at the client interface.

In addition, the system of the present specification is structured to detect at least one predetermined event, including, but not limited to mouse clicks and/or navigation. At least one embodiment of the system is structured to transmit at least one session data element and/or session data set to the measurement service for analysis.

In addition, the present specification includes a method for measuring web traffic. At least one embodiment of the method includes submitting a first request from the client interface to the web server(s) and initiating a first session. In addition, the method of at least one embodiment includes serving the landing page to the client interface via the interactive computer network and loading a requested web page into the portal element deployed on the landing page. The method includes the step of detecting at least one predetermined event and communicating at least one session data element and/or session data set to the measurement service for analysis.

These and other objects, features and advantages of the present system and method will become more clear when the drawings as well as the detailed description are taken into consideration.

BRIEF DESCRIPTION OF THE DRAWINGS

For a fuller understanding of the nature of the present system and method, reference should be had to the following detailed description taken in connection with the accompanying drawings in which:

FIGS. 2A and 2B are illustrative of one embodiment of a program code embedded on a landing page.

FIGS. 2C and 2D are illustrative of at least one other embodiment of a program code embedded on a landing page.

Like reference numerals refer to like parts throughout the several views of the drawings.

DETAILED DESCRIPTION

Figure 1A:
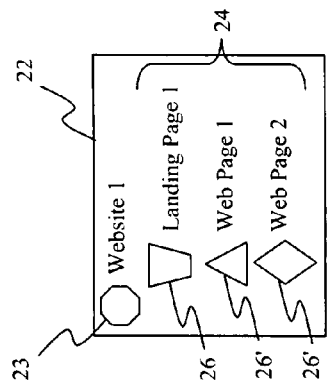
FIG. 1A is schematic representation of one embodiment of a storage medium.

As shown in the accompanying drawings, the present specification relates to a system and method for measuring, monitoring, and/or analyzing web traffic, the occurrence of one or more predetermined events, and/or other user activity transpired on one or more web pages. At least one embodiment of the present system, generally indicated as 10 throughout the figures, comprises at least one web server 20, a measurement service 30, which may include one or more servers, and one or more client interfaces 40, wherein the web server 20, the measurement service 30, and the client interface(s) 40 are disposed in a communicative relation with one another via an interactive computer network 50. In particular, as will become apparent from the discussion below, the communicative relation between the web server(s) 20, the measurement service 30, and the client interface(s) 40 may be either a direct communicative relationship or and an indirect communicative relationship. For example, in at least one embodiment the web server(s) 20 may be structured and disposed to directly communicate with the measurement service 30. In another embodiment, however, the web server(s) 20 may be structured and disposed to indirectly communicate with the measurement service 30, such as, for example, via the client interface 40.

Furthermore, the interactive computer network 50 may comprise the Internet or other access to the World Wide Web, which typically includes a vast collection of web sites having web pages including electronic content such as text, images, audio, hyperlinks, input fields, and/or other program code. It is also contemplated that, in at least one embodiment, the interactive computer network 50 comprises a private, limited, or other computer network such as an Intranet, Extranet, Local Area Network ("LAN"), or Wide Area Network ("WAN").

Moreover, the web server 20 of the various embodiments generally includes a computer processor structured to execute one or more computer programs and/or scripts which are responsible for accepting a request 60 from the client interface 40. In particular, the web server 20 includes at least one storage medium 22 capable of storing various electronic files, including but not limited to a plurality of web pages, databases, and/or other objects which facilitate operation of the present system 10. Accordingly, a request 60 transmitted from a client interface 40 to the respective web server(s) 20 are generally regarded as hypertext transfer protocol ("HTTP") requests; however, any form of request(s) 60 transmitted over the interactive computer network 50 from the client interface 40 to the one or more web servers 20 may be utilized. The web server 20 is programmed or otherwise structured to respond to a request 60 by serving the requesting client interface 40 with a response 61, generally in the form of an HTTP response, along with data such as various web pages, images, audio, etc. Specifically, an HTTP response generally includes Hypertext Markup Language ("HTML") document(s), but may include any document, object, or device structured to facilitate the implementation of the present system, including but not limited to Extensible Hypertext Markup Language ("XHTML"), an image file, audio, text, or other data. As will be discussed in greater detail below, the various web pages may be structured to facilitate either static or dynamic behavior. In particular, the web page may include JavaScript or other embedded code implementing dynamic AJAX techniques.

Figure 1:
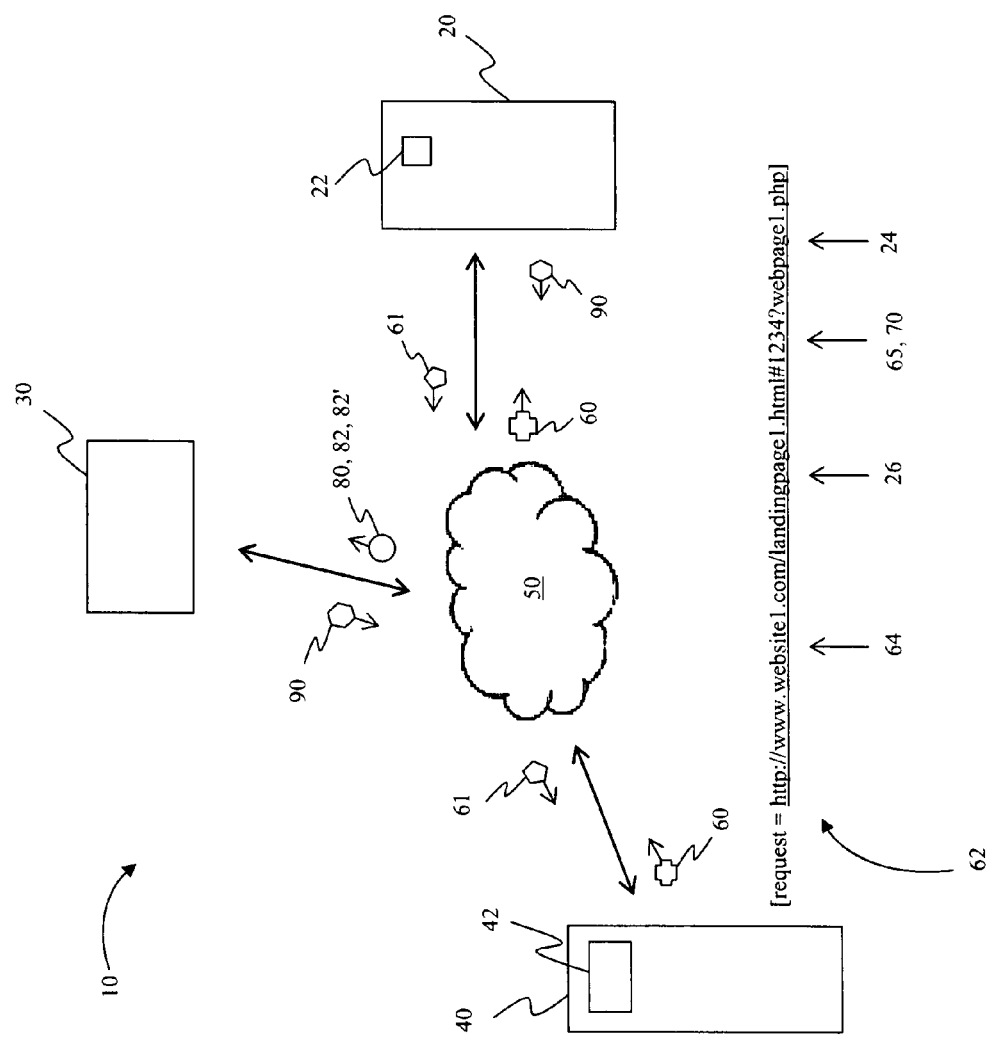
FIG. 1 is a schematic diagram illustrating one embodiment of the system for measuring web traffic in accordance with the present specification.

In addition, as discussed in greater detail below, the measurement service 30, in at least one embodiment, is generally structured to receive set(s) of data 80 and/or data elements 82, 82' via the interactive computer network 50, as illustrated in FIG. 1. However, the web server 20 and/or the client interface 40, in at least one embodiment, may transmit data or otherwise communicate with the measurement service 30 in any one or more of a plurality of manners, including but not limited to direct and/or indirect data connections. In addition, data from the web server(s) 20 may be transferred to a physical data storage medium, such as a CD-ROM, DVD-ROM, flash drive, etc., which is then distributed to the measurement service 30. In such an embodiment, the measurement service 30 is structured to read the information or data directly from the physical data storage medium.

Furthermore, and still referring to FIG. 1, the client interface 40 may include, but is in no way limited to, a desktop computer, notebook or laptop computer, handheld computer, personal digital assistant ("PDA"), cellular telephone, video game console, or any other device structured to read, write, interpret, and/or display various computer or electronic data. Furthermore, the client interface 40 is equipped with one or more web browsers 42 structured to transmit requests 60 to, and receive responses 61 from the web server(s) 20. For exemplary purposes only, the web browser 42 may include MICROSOFT® INTERNET EXPLORER®, MOZILLA® FIREFOX®, NETSCAPE NAVIGATOR®, SAFARI™, OPERA®, or other such web browser 42.

More in particular, as schematically represented in FIG. 1A, storage medium 22 of the one or more web servers 20 includes at least one web site 23, such that the web site 23 is hosted on the at least one web server 20. The web site 23 generally includes a plurality of web pages 24 wherein at least one of the plurality of web pages 24 comprises a landing page 26 having program code 27 embedded thereon. The program code 27 may include code written directly on the file associated with the landing page 26, or code or other text or objects imported from various other files or scripts. In addition, the program code 27 may include executable and/or non-executable code and/or scripts, such as, for example, JavaScript, HTML, XHTML, CSS, or other scripts, codes, or languages. An illustrative example of one embodiment of the program code 27 is shown in FIGS. 2A and 2B, which is discussed below in detail. FIGS. 2C and 2D present an illustrative example of at least one other embodiment of the program code 27, also discussed in further detail below. In addition, at least one of the web pages 24 of the web site 23 includes a non-landing page 26'.

As stated above, the client interface 40 is structured to submit or transmit at least a first request 60 to one or more web servers 20 via the interactive computer network 50. As shown in FIG. 1, the first request 60 is at least partially defined by a Uniform Resource Locator ("URL"), such as a source URL, an illustrative example of which is shown as 62. In particular, an owner, web master, marketing director, or other individual or entity in control of the web site 23, may launch or deploy one or more marketing campaign 70 to market and/or advertise the web site 23 to various users at a client interface 40, or to users who have access to a client interface 40.

Figure 3:
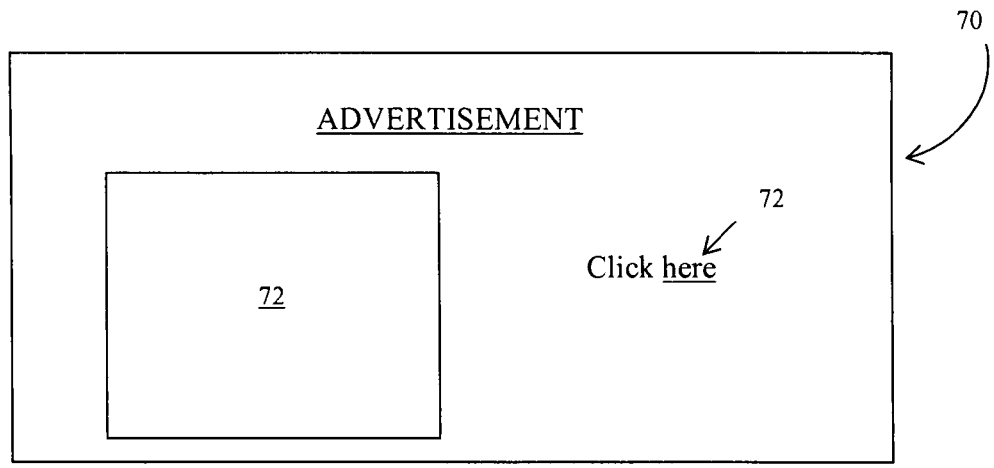
FIG. 3 is a schematic diagram representing at least one embodiment of a marketing campaign in accordance with the present specification.

For illustrative purposes only, a marketing campaign 70, represented as an advertisement, is shown in FIG. 3. Specifically, the marketing campaign 70 is structured to direct the users to the one or more web sites 23. More in particular, the source URL 62 may be embedded as a hyperlink 72 or other navigation element in an electronic mail ("e-mail") document, advertisement, article, video clip, or other document, device, or object communicated to, or otherwise exposed to one or more users.

Of course, the source URL 62 need not be electronically communicated to the user, and may instead be placed on a printed brochure, flyer, or newspaper publication, or it may be broadcast via television or radio, etc. In such a case, the user must type, transcribe or otherwise communicate the source URL 62 into a web browser 42, which will then send the first request 60 to the one or more respective web servers 20 hosting the corresponding web site 23. In particular, the user (s), individual(s), or entity directed to the source URL 62 may be part of a selected group of individuals strategically compiled through various marketing techniques. On the other hand, the user(s), individual(s), or entity directed to the source URL 62, may be any member of the public preferably with access to the World Wide Web or other interactive computer network 50.

In at least one embodiment of the present system 10, and as stated above with reference to FIG. 1A, a web site 23 typically comprises a plurality of web pages 24, which include at least one landing page 26 and at least one non-landing page 26'. In such an embodiment, the source URL 62 is structured to define or identify the location of the landing page 26 on the World Wide Web, the location of a requested web page 24, as well as the source and/or corresponding marketing campaign 70. For illustrative purposes, a source URL 62 in accordance with one embodiment of the present system 10, and as shown in FIG. 1, is as follows:

http://www.website1.com/landingpage1.html#1234?webpage1.php

Accordingly, the landing page 26 in the above example is located or accessed on the World Wide Web at "landingpage1.html" from the domain <www.website1.com>, generally referenced as 64. It is also contemplated that, in at least one embodiment, the landing page 26 is the home page of the web site 23, which may be viewed, for example, by accessing the domain <www.website1.com> in the illustrative embodiment above. In addition, the requested web page 24 in the above example is identified as "webpage1.php" from the same domain 64, and the identification of the source 65 or marketing campaign 70 of the source URL 62 is "1234".

Figure 4:
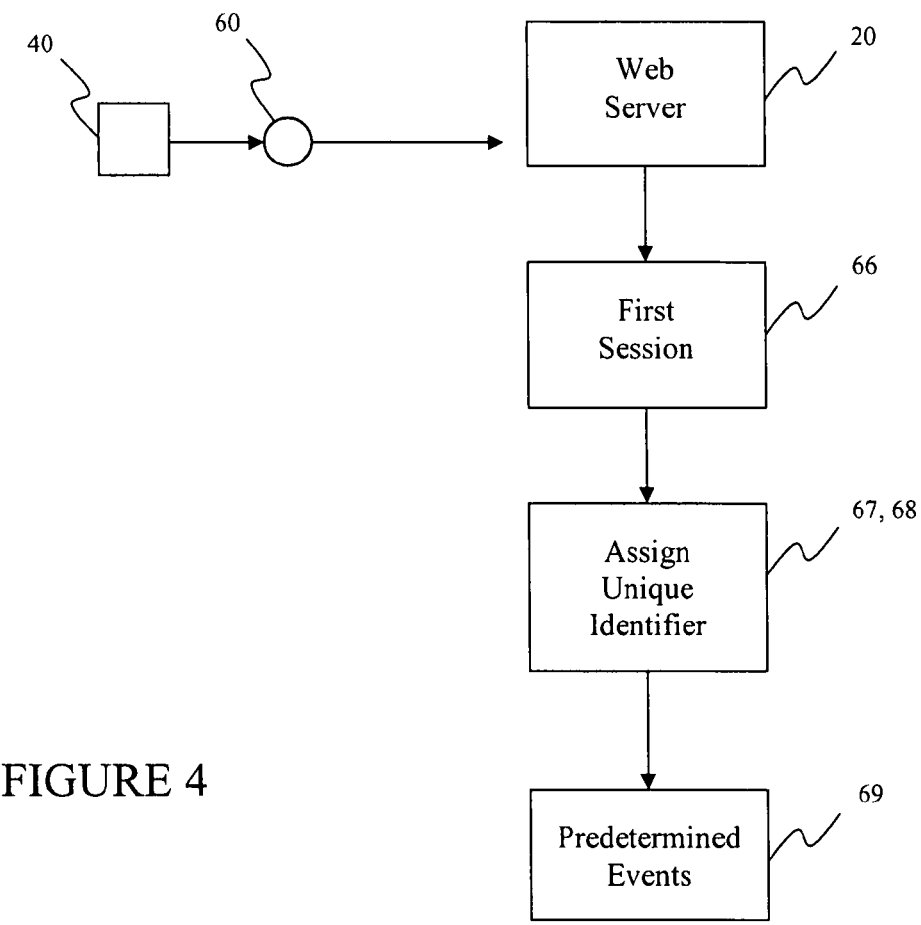
FIG. 4 is a partial flow chart of one embodiment of a first session.

As shown in FIG. 4, following the transmission of a first request 60 or source URL 62 from the client interface 40 to the corresponding web server(s) 20, a first session 66 is initiated. As used herein, a session is defined as a continuous and/or uninterrupted connection between the client interface 40 and the web server(s) 20, such as, via the interactive computer network 50. Accordingly, the first session 66 is created or initiated when the client interface 40 transmits a first request 60 to the web server(s) 20, and the web server(s) 20 respond by serving the client interface 40 with the respective HTTP response or other like response 61.

Furthermore, in one embodiment, the present system 10 includes one or more unique session identifiers 67 associated with at least the first session 66 by the program code 27 embedded on the corresponding landing page 26. Specifically, the unique session identifier(s) 67 may be one or more numbers, alpha-numeric characters, or virtually any unique identifier which may be sequentially or randomly generated. It is also contemplated that in at least one embodiment, the unique session identifiers 67 are generated based upon information gathered from the client interface 40 by the web server(s) 20 or the program code 27, such as a Media Access Control ("MAC") address, the time and/or date of access, etc. As explained in greater detail below, the unique session identifier(s) 67 is structured to link or associate the web visitor and/or the source 65 of the web visit to various navigation activities, or other predetermined events 69.

In addition to, or in lieu of the unique session identifier(s) 67 described above, at least one embodiment of the present system 10 includes a unique client identifier 68 associated with a client interface 40 by the program code 27 embedded on a landing page 26. In particular, the unique client identifier 68 of at least one embodiment includes, but is not limited to the utilization of cached files and/or cookies transmitted to and disposed on the client interface 40. Specifically, the unique client identifiers 68 are structured to identify a subsequent request from a specific client interface 40 thereby initiating a subsequent session such as, for example, when the web visitor closes the web browser 42 or otherwise terminates the first session 66, and subsequently visits the same web site 23 at a later date or time. In such an instance, the present system 10 is structured to identify the client interface 40 via the unique client identifier 68 and link or associate the first request 62 and/or the first session 66 with the subsequent request and the subsequent session. Additionally, the unique client identifier 68 is utilized to identify a specific client interface 40 during a subsequent visit to the particular web site 23 which occurs via a web page 24 that is not a landing page 26, i.e., a non-landing page 26'. However, in at least one embodiment, the unique client identifier 68 may be utilized regardless of whether the first page visited is via a landing page 26 or a non-landing page 26' on the web site 23. Accordingly, the unique client identifier 68 may be utilized to associate web navigation and/or other predetermined events 69 occurring during the first session 66 with web navigation and/or other predetermined events 69 occurring during subsequent sessions, the significance of which will be apparent as discussed below.

Figure 5:
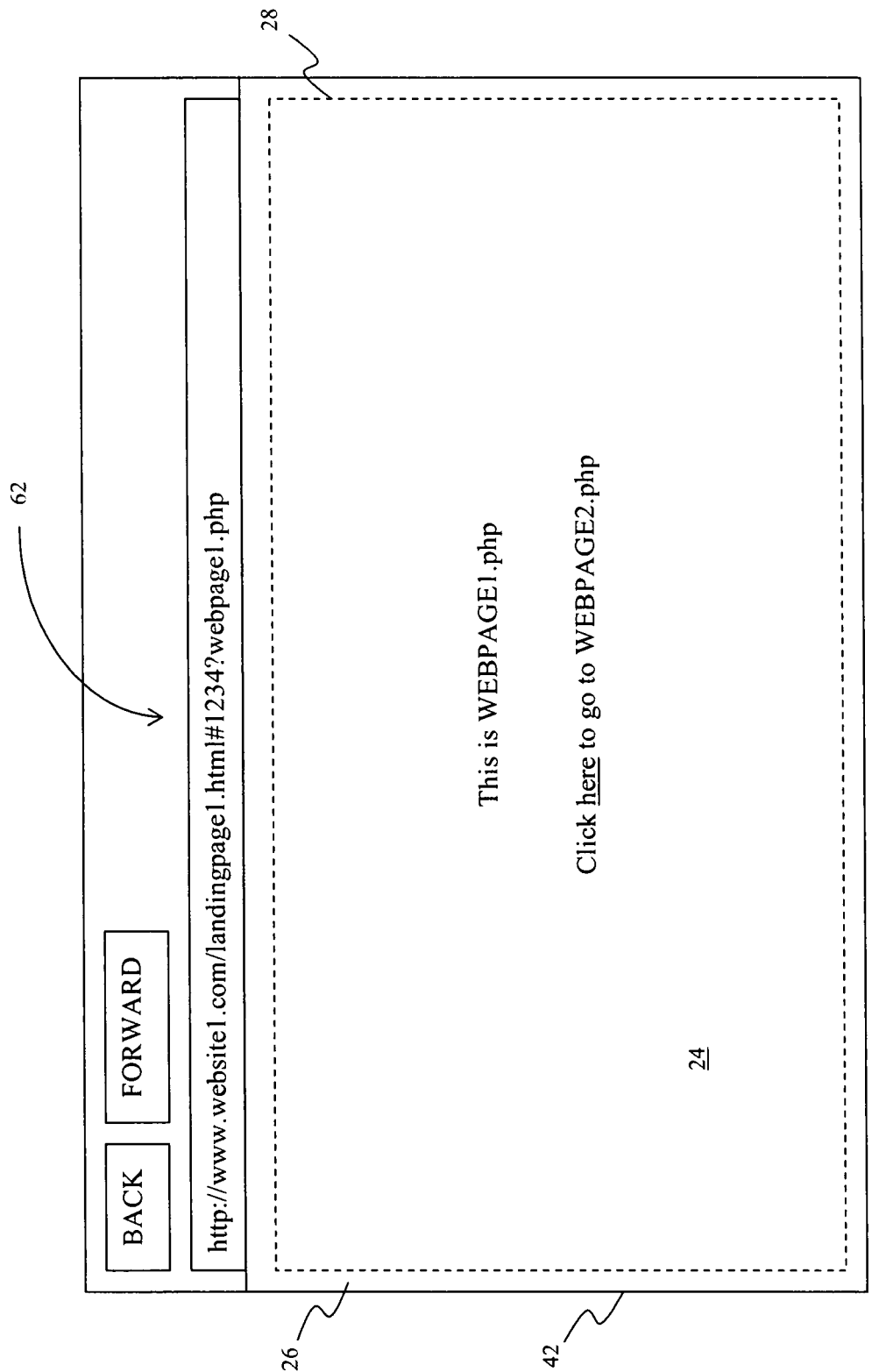
FIG. 5 is a schematic representation of one embodiment of a web browser at a client interface displaying a web page.

In the various embodiments of the present system 10, the program code 27 embedded on the landing page 26 is structured to deploy at least one portal element 28 onto the landing page 26. In particular, and as illustrated in FIG. 5, the portal element 28 is structured to display at least one web page 24 therein while simultaneously remaining substantially imperceptible at the client interface 40. For example, in one embodiment, using the source URL 62 as above, the program code 27 embedded on the landing page 26 is structured to parse the source URL 62 and identify, among other things, a landing page 26, and a requested web page 24 to display within a corresponding portal element 28 deployed on the landing page 26. In the above example, and as illustrated in FIG. 5, via the program code 27, the requested web page 24, namely, "webpage1.php", is loaded into the portal element 28 of the landing page 26, namely, "landingpage1.html".

In yet another embodiment, however, the web page 24 initially loaded into the portal element 28 is hard-coded into the landing page 26 of the web site 23. More in particular, the program code 27 embedded on the landing page 26 includes code or other text structured to display the web page 24 in the one or more corresponding portal elements 28. In such an embodiment, the source URL 62 may, but need not include the identification or location of the first requested web page 24. Any subsequent navigation between web pages 24 within the web site 23, however, changes the web page 24 displayed within the portal element 28 while the portal element 28 remains active and substantially imperceptible at the client interface 40.

In particular, once the requested web page 24 is initially loaded into the portal element 28, a user may click on or activate a hyperlink, or otherwise transmit a request to the web server 20 indicating a desire to navigate between or change the displayed web page 24. In such an instance, the portal element(s) 28 deployed on the landing page 26 is structured to display various web pages 24 therein. Specifically, the landing page 26 and the portal element 28 are structured to remain intact, active, and substantially imperceptible at the client interface 40 even during navigation between various web pages 24 of the web site 23. Furthermore, in such an embodiment, regardless of the navigation between various web pages 24 within the portal element 28, or other predetermined events 69, a first session 66, or any subsequent session, will remain active.

Figure 5A:
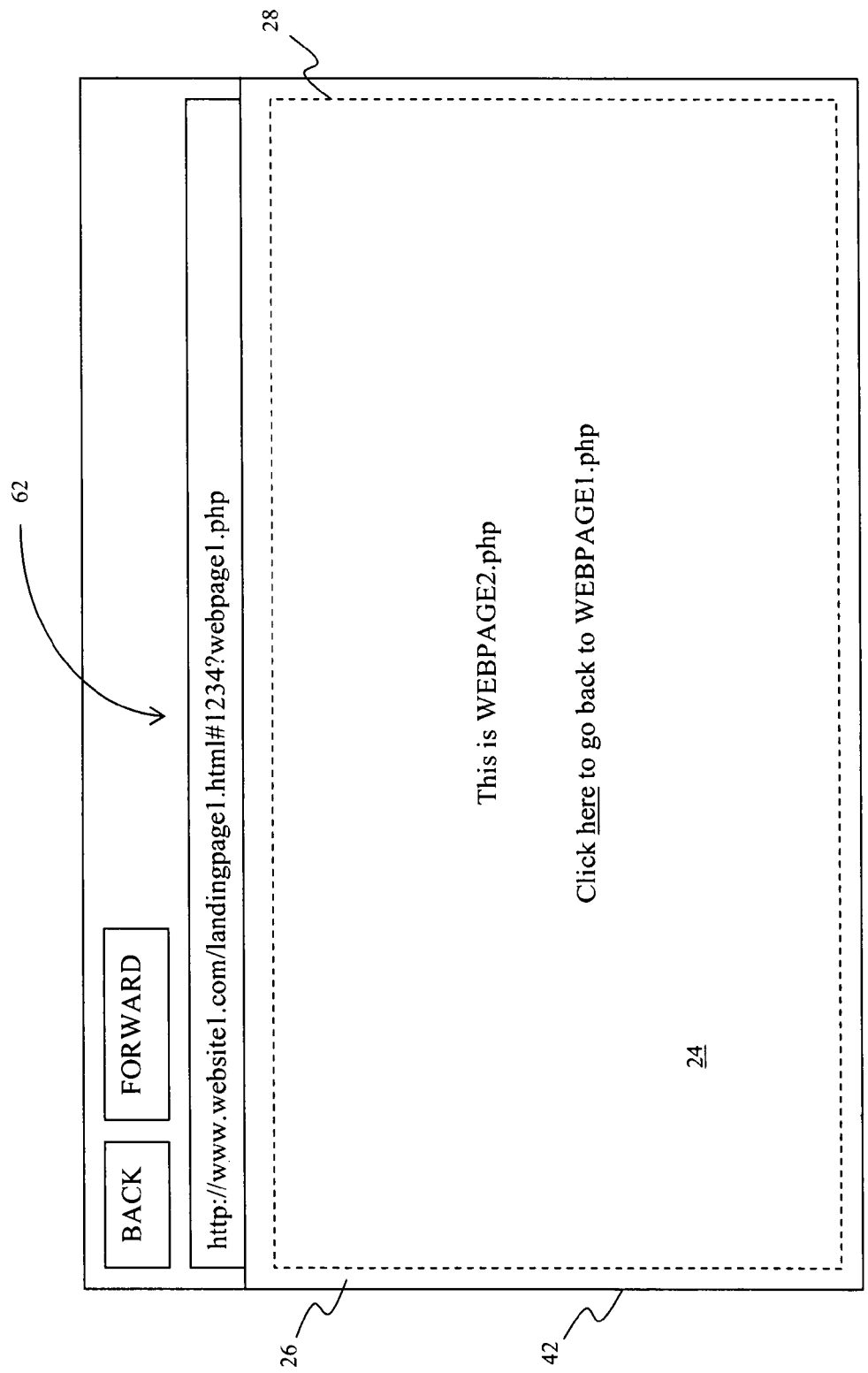
FIG. 5A is a schematic representation of the embodiment of the web browser shown in FIG. 2 displaying another web page.

Moreover, the web visitor at the client interface 40 is able to navigate the web site 23 without any apparent indication of the existence of the portal element 28, and instead appears to be navigating the web site 23 as any other web site 23 without a portal element 28. In fact, the only indication of the presence of the portal element 28 is the static nature of the URL 62 displayed in the web browser 42. Specifically, as a user navigates between various web pages 24 of the web site 23, the URL 62 will remain unchanged. For example, as noted above, FIG. 5 represents a web browser 42 displaying a landing page 26, e.g., "landingpage1.html", with the first requested web page 24, e.g., "webpage1.php", loaded into the portal element 28. If a user navigates to another web page 24, such as, for example, "webpage2.php", as illustrated in FIG. 5A, the URL 62 does not change in the web browser 42, whereas the web page 24 loaded or displayed in the portal element 28 does change, in this example, to "webpage2.php".

As stated above, the program code 27 embedded on the landing page 26 is structured to detect at least one predetermined event 69. More in particular, a predetermined event 69 includes, in at least one embodiment, a web visitor activity or a user activated event. As one example, a predetermined event 69 may include but is in no manner limited to any of a variety of clicks of a mouse or pointer and/or navigation between different ones of the plurality of web pages 24. As a further example, by clicking on, manipulating, or hovering over a particular button, text, or hyperlink, a web visitor or user may play, stop, pause, rewind or fast forward a video displayed on the web page, each of which would be considered a separate predetermined event 69 detectable by the program code 27. In addition, the web visitor or user may highlight, manipulate, or move data or objects for example on a web page employing AJAX techniques, each of which may also be a detectable predetermined event 69. Furthermore, in yet another example, a predetermined event 69 detected by the program code 27 need not be user activated, and may include the duration of a session, or the duration a user spends on a particular web site, watching a video, etc.

In addition, the program code 27 embedded on the landing page 26 is further structured to communicate at least one session data set 80 and/or at least one session data element 82, 82' to the measurement service 30. In particular, a session data element 82, 82' may include an event identifier, i.e., the identification of any one or more detected predetermined events 69, web page identifier(s), navigation history identifying the various web pages 24 the user visited or navigated to, a unique web site identifier, a marketing campaign identifier, i.e., identification of the source or marketing campaign 70, an advertising identifier, i.e., identification of an advertising medium associated with the marketing campaign 70, the unique client identifier(s) 67 and/or unique session identifier(s) 68, date/time, and/or any other information/data compiled or gathered by the system 10. In addition, the session data set 80 or session data element(s) 82, 82' may include at least one client data element, such as, for example, the MAC address of the client interface 42, the IP address of the client interface 40, identification of the type and version of the web browser 42, etc. In particular, the various identifiers, including, event identifier(s), web page identifiers, marketing campaign identifiers, advertising identifiers, and/or unique web site identifier(s) of at least one embodiment of the present system 10 include a series of numbers, letters, or other identifying characters or marks structured to identify one or more predetermined events 69, web pages 24, marketing campaign(s) 70, advertising mediums, or web sites 23, respectively.

Figure 6:
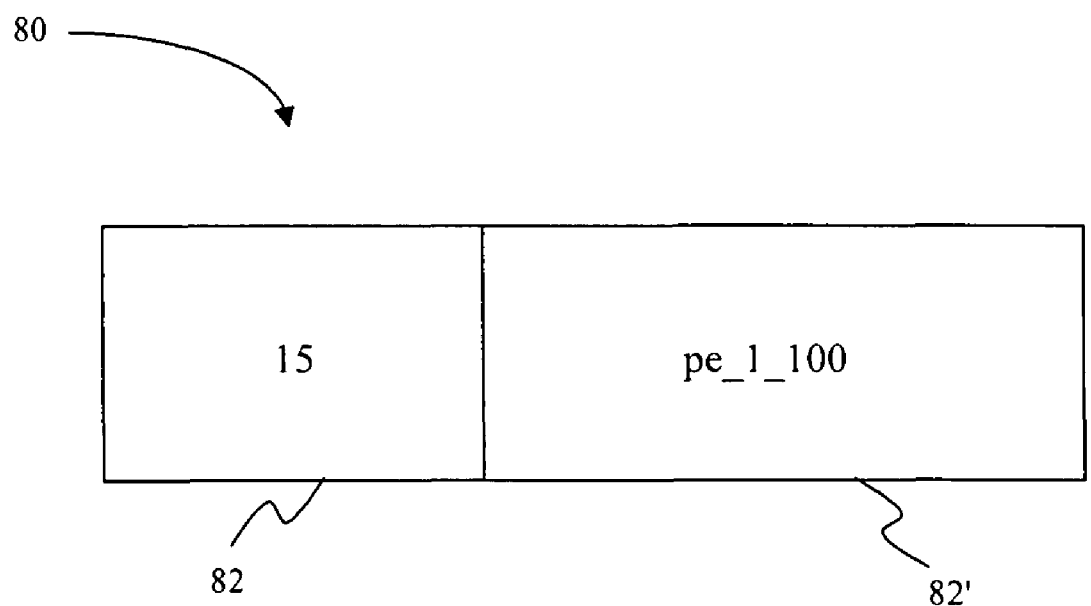
FIG. 6 is a schematic representation of one embodiment of the session data set and session data elements in accordance with the present specification.

Furthermore, the at least one session data set 80 is defined as any one or more of the various session data elements 82, 82'. In the illustrative embodiment of FIG. 6, the session data set 80 includes a unique session identifier 68 represented as session data element 82, and the identification of at least one predetermined event 69, represented as session data element 82'. In particular, the identification of the at least one predetermined event 69, i.e., the event identifier, may be coded, as shown in FIG. 6. As illustrated, "pe_1_100" is parsed into a predetermined event ("pe") represented by number "1" having a value of "100" which may, for example, define the duration of a first session 66 as being active for 100 seconds. As such, in the example shown in FIG. 6, web visitor having a unique session identifier of "15" had a first session 66 active for "100" seconds. Of course, any of a multitude of other variations, codes, and identifiers are contemplated and are encompassed within the spirit and intent of the present system 10.

Accordingly, the measurement service 30 of the system 10 is structured to receive and/or analyze the session data set 80 and/or the session data element(s) 82, 82'. The measurement service 30 of at least one embodiment is structured to generate reports based upon the various session data element(s) 82, 82' and/or session data set(s) 80 received in association with the respective web site 23. Thus, based upon the data, reports, and/or other information derived by the system 10, a web site owner, web master, or other entity is equipped to manipulate the corresponding web sites 23 and/or marketing campaigns 70 in order to maximize the return on investment therefrom.

In addition, at least one embodiment of the present system 10 further includes an auxiliary code 90 transmitted to the web browser 42 and/or landing page 26 via the interactive computer network 50. The auxiliary code 90 may be transmitted to the web browser 42 and/or landing page 26 randomly, at predetermined intervals, and/or in response to analysis of the session data set 80, session data element(s) 82, 82' and/or one or more predetermined event 69. For example, the system 10 may analyze the location of the user, the purchase history of the user, the loyalty of the user, and/or other predetermined events 69 to determine whether or not to transmit the auxiliary code 90. In addition, as shown in FIG. 1, it is contemplated that either one or both the web server(s) 20 and/or the measurement service 30 of the present system 10 may be structured to transmit the auxiliary code 90 via the interactive computer network 50.

Figure 7:
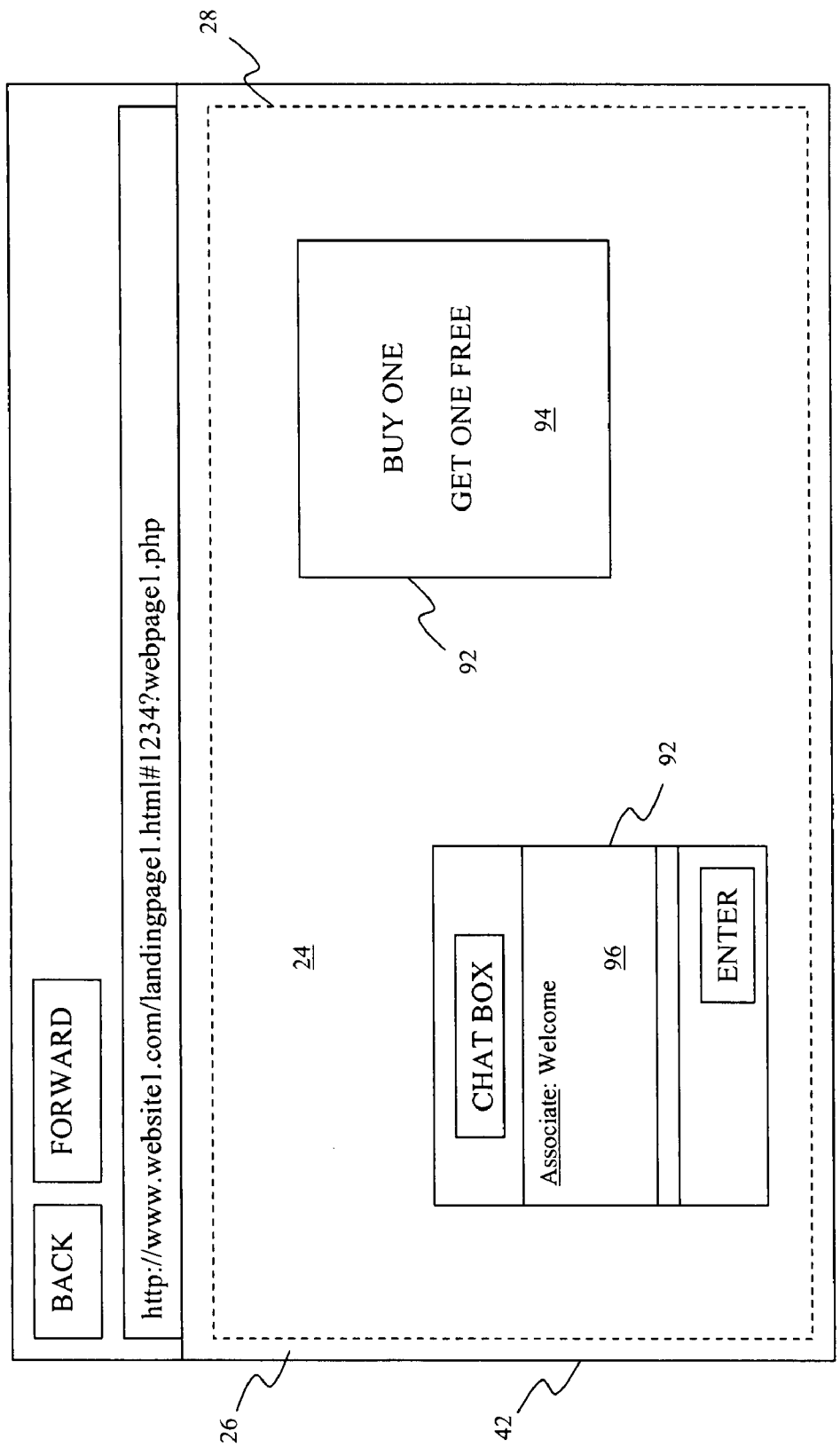
FIG. 7 is a schematic representation of a web browser at a client interface displaying auxiliary modules of at least one embodiment.

Moreover, in at least one embodiment, the auxiliary code 90 is structured to deploy one or more auxiliary modules 92, which are activated at the client interface 40. For example, as shown in FIG. 7, the auxiliary module(s) 92 may include a promotional element 94, such as, for example, a coupon, advertisement, or the like. Furthermore, in at least one embodiment, a user at the client interface 40 may interact with the auxiliary module(s) 92. Accordingly, and as also illustrated in FIG. 7, the auxiliary module 92 may include a chat box 96 such that the user can chat with an associate or other individual or Internet both via the interactive computer network 50.

Referring again to the illustrative example of the program code 27 shown in FIGS. 2A and 2B, the portal element(s) 28 in at least one embodiment are partially defined as HTML <iframe> tags. However, any tag or element which facilitates the implementation of the present system 10 may be utilized, including, but not limited to <frame>, <div>, or <span> tags. In particular, any element which facilitates embedding or displaying web pages 24 or web page content therein is contemplated.

Looking further to the embodiment of the program code 27 as shown in the FIGS. 2A and 2B, and in particular lines 7-9 of FIG. 2A, the portal element 28 is defined in the <style> tag to ensure that the portal element 28, i.e., the <iframe> in this particular embodiment, is substantially imperceptible at the client interface 40. Furthermore, on lines 11-34, beginning in FIG. 2A and continued in FIG. 2B, a global variable identified as "guanoo" is defined and includes, among other elements, a unique site number, "123" in this particular embodiment, and a campaign name, which is initially blank. Beginning on line 16 of FIG. 2A, the global variable "guanoo" also includes a function entitled "loaded" which is invoked each time a new web page 24 is loaded into the portal element 28 of the landing page 26. In addition, a variable entitled "url" is created and defined to hold the URL of the particular web page 24 loaded in the portal element 28. As represented by the program code 27 beginning on line 24 of FIG. 2A, the present system 10 is structured to transmit or send at least one session data element 82 or session data set 80 to the measurement service 30. In this instance, the program code 27 is structured to send the site identification, the date and time, the URL of the web page loaded in the portal element, a referring web page, and identification of the marketing campaign 70 to the measurement service 30.

Moreover, on line 25 of FIG. 2A, the system 10 is structured to update the document title of the web page as it appears on the client interface 40 to include the title of the web page 24 which has been loaded into the portal element 28 of the landing page 26. Accordingly, with the exception of the static nature of the source URL 62 in the web browser address bar as described above, the portal element 28 is structured to remain substantially imperceptible at the client interface 40.

In addition, as shown in the "script" function on lines 28-34 of FIG. 2B, the measurement service 30 of at least one embodiment may be hosted at a web domain that is different than the web domain in which the web site 23 is hosted. Specifically, in the illustrative embodiment of FIGS. 2A and 2B, and in particular, as shown on line 30 of FIG. 2B, the measurement service 30 is hosted at the domain <www.guanoo.com>, which may be different than the domain of the web site 23.

Finally, lines 39-47 of FIG. 2B illustrate that the program code 27 defines the portal element 28, i.e., the <iframe> element in this particular embodiment, and parses the source URL 62 to identify the requested web page 24 and/or the marketing campaign 70. In particular, as represented in lines 41 and 42 of FIG. 2B, the variable 'q' holds the position of a '?' in the source URL 62, and the variable 'h' holds the position of a '#' in the source URL 62. Accordingly, by utilizing the variables 'q' and 'h', the program code 27 is structured to identify the requested web page 24 and the marketing campaign 70 associated with the particular source URL 62. Furthermore, as shown at line 44 of FIG. 2B, the unique client identifier 68, in this embodiment a cached JavaScript file entitled "goal.php" is requested from the measurement service 30 at the measurement service domain name, i.e., <www.guanoo.com> in this particular illustrative embodiment. As above, the unique client identifier 68, namely, the cached file entitled "goal.php", may be utilized to identify the client interface 40 and/or measure one or more predetermined event 69 in a subsequent session, which may be initiated via a landing page 26 or a non-landing page 26'.

Another illustrative embodiment of the program code 27 embedded on the landing page 26 is shown in FIGS. 2C and 2D. In particular, as described above and shown in FIG. 2D at lines 45-52, in at least one embodiment, rather than identifying a requested web page 24 from the source URL 62, and loading it into the portal element 28, the requested web page 24 is hard-coded or otherwise included within the program code 27. Furthermore, the illustrative embodiment shown in FIGS. 2C and 2D also includes a "display" function at lines 33-38 of FIG. 2D structured to display and/or otherwise load the web page 24 into the portal element 28. It is also noted that, in light of hard-coding the web page 24 into the landing page 26, as shown in FIG. 2D, the program code 27 need not parse the source URL 62 to identify the requested web page 24.

Of course is should be understood that the above represents but two illustrative embodiments of the program code 27 which may be embedded on the landing page 26 and are not to be considered in a limiting sense. As just one further example, at least one embodiment of the present system 10 may include one or more landing pages 26 for each marketing campaign 70.

Figure 8:
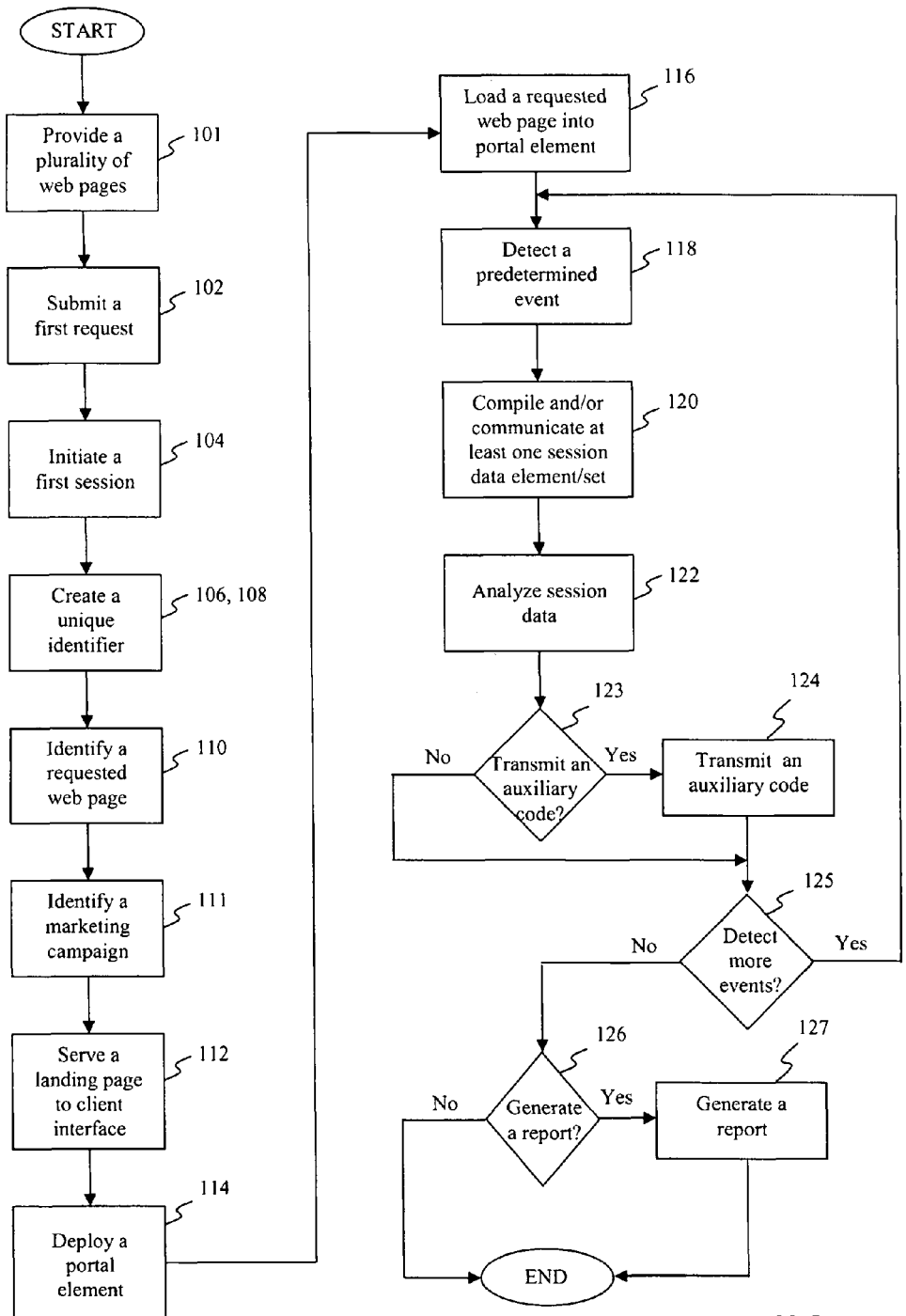
FIG. 8 is a flow chart illustrating at least one embodiment of the method for measuring web traffic.

In addition, as shown in FIG. 8, the present specification presents a method for measuring web traffic, generally as shown at 100. In particular, the present method 100 includes providing 101 a plurality of web pages 24. Moreover, the one or more web servers 20 include a plurality of web pages 24, at least one of which is a landing page 26. Furthermore, in at least one embodiment, the plurality of web pages 24 are associated with a single domain name, however, it is contemplated that the method 100 may be implemented with a plurality of domain names. In addition, the method 100 further includes submitting 102 a first request 60 from a client interface 40 to at least one web server 20. As described in detail above, the client interface 40 is disposed in a communicative relation with an interactive computer network 50 and the first request 60 includes a source URL 62 corresponding to at least a landing page 26 on a web site 23 hosted on the at least one web server 20.

In FIG. 8, the present method 100 further includes initiating 104 a first session 66 with the client interface 40. As above, a session is defined as a continuous or uninterrupted connection between the client interface 40 and the web server(s) 20, such as, via the interactive computer network 50.

Furthermore, the present method 100 includes creating a unique identifier 106, 108, and in particular, creating a unique session identifier 67 corresponding to the first session, represented as 106, and/or creating a unique client identifier 68 associated with the client interface 40, represented as 108. Specifically, as noted above, the unique identifiers 67, 68 are structured to facilitate the linking of detected predetermined events 69 or purchases with a user, client interface 40, source, and/or marketing campaign 70 so as to assist the owner or other administrator of the web site 23 to maximize or improve its return on investment.

In addition, as shown in FIG. 8, the method 100 in at least one embodiment includes identifying 110 a requested web page 24. In particular, and as stated above, the source URL 62 in at least one embodiment is structured to include the web address or identification of the requested web page 24. As such, identifying 110 a requested web page 24 includes parsing the source URL 62 via the program code 27. Specifically, in the embodiment of the source URL 62 presented above and in FIG. 1, the requested web page 24 is identified as "webpage1.php". In yet another embodiment, however, the requested web page 24 may be hard-coded or otherwise included on the landing page 26 itself. Accordingly, the method 100 includes identifying 110 the hard-coded or otherwise included web page 24 requested.

Furthermore, at least one embodiment of the present method 100 includes identifying 111 one or more marketing campaigns 70 associated with the source URL 62. In the embodiment of FIG. 8, the method 100 includes parsing the source URL 62 via the program code 27 for identification of the marketing campaign 70. Specifically, in the source URL 62 exemplified above and in FIG. 1, the advertising medium, marketing campaign 70, and/or other source 65 may be identified as "1234". As noted above, however, at least one embodiment includes a separate landing page 26 for each marketing campaign 70, and as such, identification of the marketing campaign 70 may not be needed.

The method 100 of the present specification further includes serving 112 a landing page 26 to the client interface 40 over the interactive computer network 50. In particular, and as above, following a request 60 from a client interface 40, the web server(s) 20 are structured to transmit a response 61, which may be in the form of an HTTP response, via the interactive computer network 50. The response 61, in at least one embodiment of the present method 100, includes serving 112 the landing page 26 to the client interface 40.

Additionally, the present method 100 includes deploying 114 a portal element 28 on the landing page 26, wherein the portal element 28 remains substantially imperceptible at the client interface 40. Furthermore, and as illustrated in FIG. 8, the method 100 includes loading 116 the requested web page 24 into the portal element 28 deployed on the landing page 26. More in particular, the requested web page 24, in at least one embodiment, may be identified in the source URL 62 and may include a separate file, such as an HTML file. In at least one embodiment, however, the landing page 26 includes the code or other text for the web page 24 hard-coded thereon. As such, the web page 24 which is loaded within the portal element 28 may be a separate file or hard-coded within the landing page 26, and in particular, in the program code 27 thereon.

The method 100 further includes the step of detecting 118 predetermined events 69 via the program code 27 embedded on the landing page 26. For example, a user may navigate between web pages 24, click on, hover over, or otherwise manipulate buttons, hyperlinks, or other objects, all of which are detectable predetermined events 69. In addition, the duration a user spends on each web page 24 and/or the web site 23 are also a detectable predetermined events 69.

At least one embodiment of the present method 100 further includes compiling and/or communicating 120 at least one session data element 82, 82' and/or at least one session data set 80 to a measurement service 30. Specifically, the session data set 80 or element 82, 82' may include, by way of example only, the identification of the web site 23, i.e., a unique web site identifier, the identification of one or more predetermined events 69, i.e., event identifier(s), the source 65 or marketing campaign 70, identification data of the client interface 40, i.e., client data element(s), the date/time, the unique session identifier 67, and/or the unique client identifier 68.

The present method 100 may also include analyzing 122 a session data set 80 and/or at least one session data element 82, 82'. Further, the present method 100 provides for transmitting 124 auxiliary code 90 to the web browser 42 and/or landing page 26, and generating 127 one or more data reports based upon analysis 122 of the session data set/data element(s) 80, 82, 82'. In particular, the web server(s) 20 and/or the measurement service 30 are structured to analyze 122 the session data set/data element(s) 80, 82 and respond by transmitting 124 auxiliary code 90 to the web browser 42 which, in effect, causes one or more auxiliary modules 92 to display at the client interface 40, as shown in FIG. 7. As represented in FIG. 8 at 123, however, the method 100 may elect not to send auxiliary code 90 based upon the analysis 122 of the session data set/element(s) 80, 82, 82' or other information.

In addition, and as represented as 125 in FIG. 8, the method 100 may continue to detect predetermined events 69 until, for example, the user at the client interface 40 closes the web browser 42 or otherwise ends the session.

Further, the method 100 may include generating 127 one or more data reports, as illustrated in FIG. 8. Accordingly, a data report may be generated at specified time intervals, upon a predetermined condition, or at the request of a web site owner, administrator, or other individual or entity. In general, a data report includes information structured to facilitate the web site owner or administrator to maximize or improve his/her return on investment. FIG. 8 illustrates that a data report may, but need not be generated, at 126.

Figure 9:
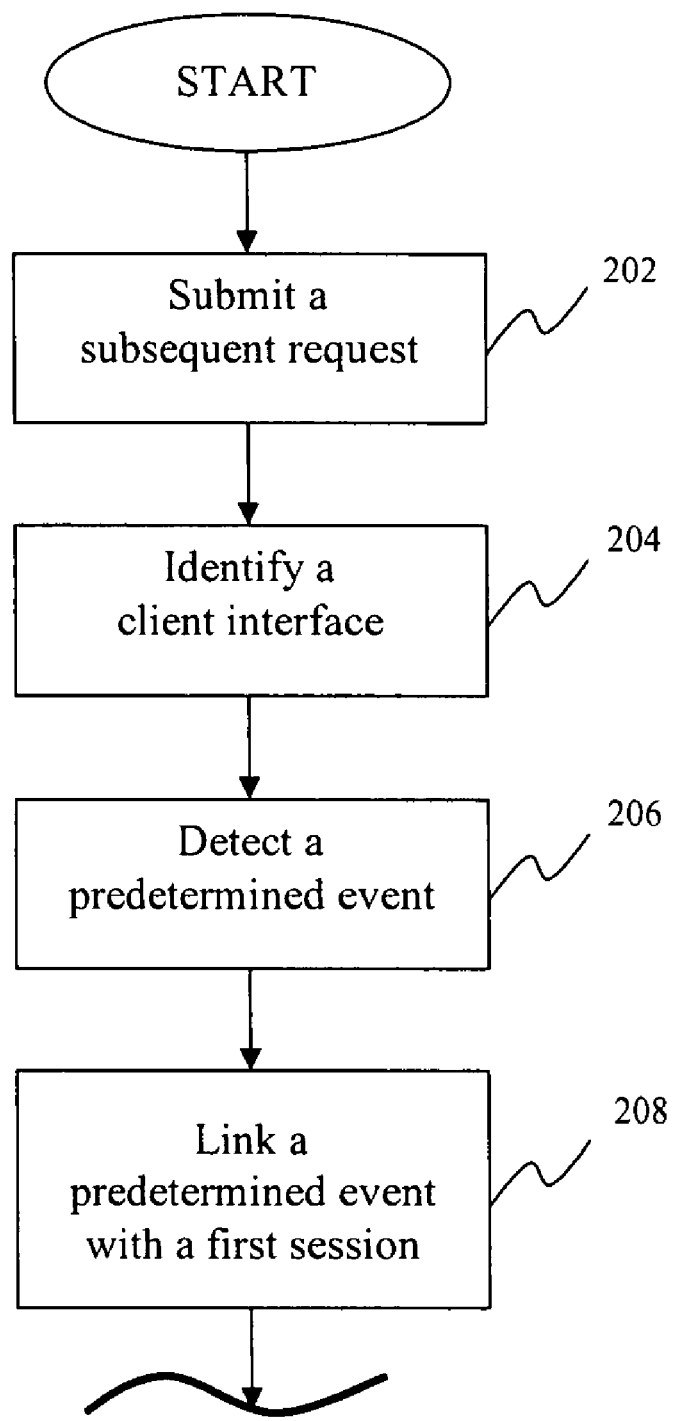
FIG. 9 is a partial flow chart illustrating at least one embodiment of the method for measuring web traffic.

FIG. 9 is a partial flow chart of the present method 100 demonstrating a link or other association between a subsequent request or session with a first session 66 and/or predetermined events 69 detected in a first session 66. In particular, in at least one embodiment, the present method further includes submitting 202 a subsequent request to the web server(s) 20 and creating a subsequent session. The subsequent request may include a subsequent URL which directs a user to a landing page 26 or any other web page 24 of the web site 23. The present method 100, as illustrated in FIG. 9, also includes identifying 204 a client interface 40 with a unique client identifier 68 created during the first session 66. In particular, as described above, at least one embodiment of the method 100 includes creating a unique client identifier 68, such as, for example, by utilizing a cached file and/or cookie as at 106, 108. Of course, in at least one alternate embodiment, the present method 100 may include identifying 204 a client interface 40 via a unique session identifier 67 created during a first session 66, or a subsequent session.

Further, the present method includes detecting 206 one or more predetermined events 69 occurring during a subsequent session. In addition, utilizing the unique client identifier 68, the method 100, in at least one embodiment, includes linking 208 the detected predetermined events 69, and other data, occurring in the subsequent session, with predetermined events 69, the source, marketing campaign 70, and other data from the first session 66. Although not illustrated in FIG. 9, the data may then be compiled and/or communicated to the measurement service 30. As above, the measurement service 30 and/or the web server(s) 20 may then transmit 121 auxiliary code 90 and/or generate data reports.

Since many modifications, variations and changes in detail can be made to the embodiments described herein, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A system for measuring web traffic conducted via a client interface, comprising:
   at least one web server disposed in a communicative relation with the client interface via an interactive computer network,
   at least one web site hosted on said at least one web server, said web site including a plurality of web pages disposed on said at least one web server, wherein at least one of said plurality of web pages disposed on said at least one web server comprises a landing page having program code embedded thereon, and wherein at least one of said plurality of web pages comprises a non-landing page,
   the client interface being disposed in a communicative relation with said interactive computer network and structured to submit a first request to said web server and initiate a first session, said first request at least partially defined by at least one source URL,
   a unique client identifier associated with the client interface by said program code,
   said unique client identifier structured to identify the client interface in a subsequent session, wherein said subsequent session is initiated via a subsequent request comprising a URL corresponding to at least one of said plurality of web pages on said web site,
   a portal element deployed onto said landing page via said program code embedded on said landing page, said portal element structured to display at least one of said plurality of web pages therein while said portal element remains substantially imperceptible at the client interface,
   said program code embedded on said landing page structured to detect at least one predetermined event,
   a measurement service disposed in a communicative relation with said interactive computer network,
   said program code further structured to communicate at least one session data element to said measurement service, and
   said measurement service being structured to receive and analyze said at least one session data element.

2. The system as recited in claim 1 wherein said program code is further structured to compile and transmit at least one session data set to said measurement service, wherein said session data set includes said at least one session data element.

3. The system as recited in claim 2 wherein said source URL is structured to be parsed to identify a marketing campaign.

4. The system as recited in claim 3 wherein said program code is structured to parse said source URL.

5. The system as recited in claim 4 wherein said session data set includes a marketing campaign identifier.

6. The system as recited in claim 5 wherein said session data set includes an advertising identifier associated with said marketing campaign.

7. The system as recited in claim 2 wherein said session data set includes an event identifier.

8. The system as recited in claim 2 wherein said session data set includes a web page identifier corresponding to at least one of said plurality of web pages.

9. The system as recited in claim 2 wherein said session data set includes at least one client data element.

10. The system as recited in claim 2 wherein said session data set includes a unique session identifier.

11. The system as recited in claim 2 wherein said session data set includes a unique web site identifier.

12. The system as recited in claim 1 wherein at least one of said plurality of web pages is hard-coded within said program code.

13. The system as recited in claim 1 wherein said at least one predetermined event includes a duration of said session.

14. The system as recited in claim 1 wherein said at least one predetermined event includes a user activated event.

15. The system as recited in claim 1 wherein said at least one predetermined event includes a pointer activity.

16. The system as recited in claim 1 wherein said at least one predetermined event includes navigation between different ones of said plurality of web pages.

17. The system as recited in claim 1 further comprising at least one auxiliary module deployed at said client interface.

18. The system as recited in claim 17 further comprising an auxiliary code transmitted to said landing page, wherein said auxiliary code is structured to deploy said auxiliary module.

19. The system as recited in claim 18 wherein said at least one auxiliary module includes a promotional element.

20. The system as recited in claim 18 wherein said at least one auxiliary module is structured to prompt user action.

21. The system as recited in claim 20 wherein said at least one auxiliary module includes a chat box.

22. A system for measuring web traffic conducted via a client interface, comprising:
   at least one web server disposed in a communicative relation with the client interface via an interactive computer network, at least one web site hosted on said at least one web server, said web site including a plurality of web pages, wherein at least one of said plurality of web pages comprises a landing page having program code thereon, and at least one of said plurality of web pages comprises a non-landing page, said non-landing page at least partially defined as a web page absent said program code embedded thereon, said landing page and said program code residing on said at least one web server hosting said at least one web site, the client interface being disposed in a communicative relation with said interactive computer network and structured to submit a first request to said web server and initiate a first session, said first request at least partially defined by at least one source URL, a unique client identifier being associated with the client interface by said program code, said unique client identifier structured to identify the client interface in a subsequent session, wherein said subsequent session is initiated via a subsequent request comprising a URL corresponding to at least one of said plurality of web pages on said web site, said program code structured to identify at least one non-landing page as a requested web page, at least one portal element deployed onto said landing page via said program code, said portal element structured to display said requested web page therein, said program code structured to detect at least one predetermined event, said portal element deployed on said landing page further structured to display a different one of said plurality of web pages therein in response to a subsequent request, a measurement service disposed in a communicative relation with said at least one web server via said interactive computer network, said program code further structured to communicate at least one session data element to said measurement service, and said measurement service being structured to receive and analyze said at least one session data element.

23. A system for measuring web traffic conducted via a client interface, comprising:

at least one web server disposed in a communicative relation with the client interface via an interactive computer network, at least one web site hosted on said web server, said web site including a plurality of web pages, wherein at least one of said plurality of web pages comprises a landing page having program code disposed directly thereon, and at least one of said plurality of web pages comprises a non-landing page, a marketing campaign having at least one advertising medium associated therewith, at least one source URL corresponding to and structured to at least identify said marketing campaign, the client interface being disposed in a communicative relation with said interactive computer network and structured to submit a first request to said web server and initiate a first session, said first request at least partially defined by said source URL, a unique client identifier being associated with the client interface by said program code, said unique client identifier structured to identify the client interface in a subsequent session, wherein said subsequent session is initiated via a subsequent request comprising a URL corresponding to at least one of said plurality of web pages on said web site, at least one portal element deployed onto said landing page by said program code disposed directly on said landing page, said portal element structured to display at least one of said plurality of web pages therein while said portal element remains substantially imperceptible at the client interface, said program code disposed directly on said landing page structured to identify said marketing campaign corresponding to said source URL, said program code disposed directly on said landing page being further structured to detect at least one predetermined event, a measurement service disposed in a communicative relation with said at least one web server and the client interface via said interactive computer network, said program code further structured to communicate a session data set to said measurement service, and said measurement service being structured to receive and analyze said session data set.

* * * * *